(12) United States Patent
Kotab

(10) Patent No.: US 10,536,990 B1
(45) Date of Patent: Jan. 14, 2020

(54) TELEPHONE BASE STATION FOR COMBINING MOBILE AND TERRESTRIAL TELEPHONE SERVICE

(76) Inventor: Dominic M. Kotab, San Jose, CA (US)

( * ) Notice: Subject to any disclaimer, the term of this patent is extended or adjusted under 35 U.S.C. 154(b) by 864 days.

(21) Appl. No.: 12/698,005

(22) Filed: Feb. 1, 2010

Related U.S. Application Data

(60) Provisional application No. 61/149,644, filed on Feb. 3, 2009.

(51) Int. Cl.
*H04B 1/38* (2015.01)
*H04M 1/00* (2006.01)
*H04M 3/00* (2006.01)
*H04W 4/00* (2018.01)
*H04W 88/08* (2009.01)

(52) U.S. Cl.
CPC .................................. *H04W 88/08* (2013.01)

(58) Field of Classification Search
CPC .... H04W 84/16; H04W 88/08; H04M 7/0096
USPC ....... 379/198, 231, 233; 455/65, 554.1, 561, 455/465
See application file for complete search history.

(56) References Cited

U.S. PATENT DOCUMENTS

| | | | | |
|---|---|---|---|---|
| 5,671,267 A * | 9/1997 | August | ............ | H04M 1/72502 379/102.03 |
| 5,946,637 A * | 8/1999 | Umbach | ............... | H01M 2/105 320/113 |
| 6,154,650 A * | 11/2000 | Abidi et al. | ................... | 455/433 |
| 6,381,461 B1 * | 4/2002 | Besson | ................ | H04W 36/06 455/450 |
| 7,299,060 B1 * | 11/2007 | Dronamraju | ...... | H04M 1/72502 455/416 |
| 7,437,148 B1 * | 10/2008 | Vaghi | ................... | H04M 1/006 379/142.05 |
| 7,477,904 B2 * | 1/2009 | Evans et al. | ............... | 455/456.1 |
| 8,494,478 B1 * | 7/2013 | Ponnangath | ........ | G06F 11/1456 455/343.1 |
| 8,879,702 B1 * | 11/2014 | White | ................ | H04M 3/42042 379/142.04 |
| 2001/0039595 A1 * | 11/2001 | Kaihlaniemi | ......... | G06F 13/102 719/321 |
| 2003/0045229 A1 * | 3/2003 | Snelgrove et al. | .......... | 455/3.05 |
| 2003/0078071 A1 * | 4/2003 | Uchiyama | ............. | H04M 1/006 455/557 |

(Continued)

*Primary Examiner* — Matthew W Genack
(74) *Attorney, Agent, or Firm* — Zilka-Kotab, P.C.

(57) ABSTRACT

According to one embodiment, a system for placing and receiving telephone calls includes a telephone base station which comprises a first communication port for creating a terrestrial telephone connection for at least placing terrestrial telephone calls using a first telephone network, a second communication port for creating a link to a mobile telephone for at least placing mobile telephone calls using a second telephone network, a third communication port for creating a link to a terrestrial telephone, and a processor. In another embodiment, a system for placing and receiving telephone calls includes a telephone base station, a processor, and at least one handset linked to the telephone base station for telephone communications. The base station includes communication port(s) for creating a terrestrial telephone connection for placing telephone calls and for creating a link to a mobile telephone for placing mobile telephone calls. Other systems and methods are also described.

15 Claims, 9 Drawing Sheets

(56) References Cited

U.S. PATENT DOCUMENTS

| | | | |
|---|---|---|---|
| 2005/0232186 A1* | 10/2005 | Karaoguz | H04L 29/06027 370/328 |
| 2005/0232247 A1* | 10/2005 | Whitley | H04L 12/2803 370/352 |
| 2006/0159074 A1* | 7/2006 | Diebold et al. | 370/352 |
| 2006/0223394 A1* | 10/2006 | Porat | B63B 22/24 441/136 |
| 2006/0281445 A1* | 12/2006 | Dickinson | 455/417 |
| 2007/0135120 A1* | 6/2007 | King | H04W 84/14 455/426.2 |
| 2007/0206735 A1* | 9/2007 | Silver et al. | 379/88.19 |
| 2008/0085700 A1* | 4/2008 | Arora | H04L 67/26 455/414.3 |
| 2009/0069915 A1* | 3/2009 | Khedouri et al. | 700/94 |
| 2009/0323911 A1* | 12/2009 | Dury | H04M 1/573 379/88.22 |
| 2010/0180313 A1* | 7/2010 | Bi | H04N 5/76 725/110 |
| 2010/0273486 A1* | 10/2010 | Kharia et al. | 455/436 |
| 2010/0284361 A1* | 11/2010 | Kihlberg | H04M 1/72513 370/329 |

\* cited by examiner

TELEPHONE BASE STATION FOR COMBINING MOBILE AND TERRESTRIAL TELEPHONE SERVICE

RELATED APPLICATIONS

This application claims priority to U.S. provisional patent application No. 61/149,644, filed Feb. 3, 2009, and which is herein incorporated by reference.

FIELD OF THE INVENTION

The present invention relates to a system for sending and/or receiving incoming and/or outgoing mobile-based and terrestrial-based telephone calls on a single user interface device.

BACKGROUND

Current mobile phone devices do not have the ability to connect to landline or terrestrial-based telephone systems without first traversing the mobile phone network. Similarly, terrestrial-based (e.g., "land-line" or "hard line") telephones do not have the ability to connect to a mobile phone network. Accordingly, the advantages of mobile phone devices and their accompanying features and service plans may not be used with terrestrial-based telephones, such as prepaid or included long distance, free mobile-to-mobile calling, rollover minutes, etc.

SUMMARY

According to one embodiment, a system for placing and receiving telephone calls includes a telephone base station which comprises a first communication port for creating a terrestrial telephone connection for at least placing terrestrial telephone calls using a first telephone network, a second communication port for creating a link to a mobile telephone for at least placing mobile telephone calls using a second telephone network, a third communication port for creating a link to a terrestrial telephone, and a processor.

In another embodiment, a system for placing and receiving telephone calls includes a telephone base station which comprises a first communication port for creating a terrestrial telephone connection for at least placing terrestrial telephone calls using a first telephone network, a second communication port for creating a link to a mobile telephone for at least placing mobile telephone calls using a second telephone network and a processor. The system also includes at least one handset linked to the telephone base station for telephone communications.

A system for placing and receiving telephone calls, according to another embodiment, includes a telephone base station which comprises a first communication port for creating a terrestrial telephone connection for at least placing terrestrial telephone calls using a first telephone network, a second communication port for creating a mobile telephone connection for at least placing mobile telephone calls using a second telephone network, a third communication port for creating a link to a terrestrial telephone, and a processor, wherein the processor determines whether to send an outgoing telephone call via the terrestrial telephone connection or via the mobile telephone connection.

In another embodiment, a system for placing and receiving telephone calls includes a telephone base station which comprises a first communication port for creating a terrestrial telephone connection for at least placing terrestrial telephone calls using a first telephone network, a second communication port for creating a mobile telephone connection for at least placing mobile telephone calls using a second telephone network, and a processor, wherein the processor determines whether to send an outgoing telephone call via the terrestrial telephone connection or via the mobile telephone connection. The system also includes at least one handset linked to the telephone base station for telephone communications.

A method for placing and receiving telephone calls, according to one embodiment, includes establishing a first connection to a terrestrial telephone network, establishing a second connection to a terrestrial telephone, and establishing a link to a mobile telephone.

In another embodiment, a method for placing and receiving telephone calls includes establishing a first connection to a terrestrial telephone network, establishing a second connection to a terrestrial telephone, and establishing a third connection to a mobile telephone network.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as illustrative modes of use, reference should be made to the following detailed description read in conjunction with the accompanying drawings.

Figure 1:
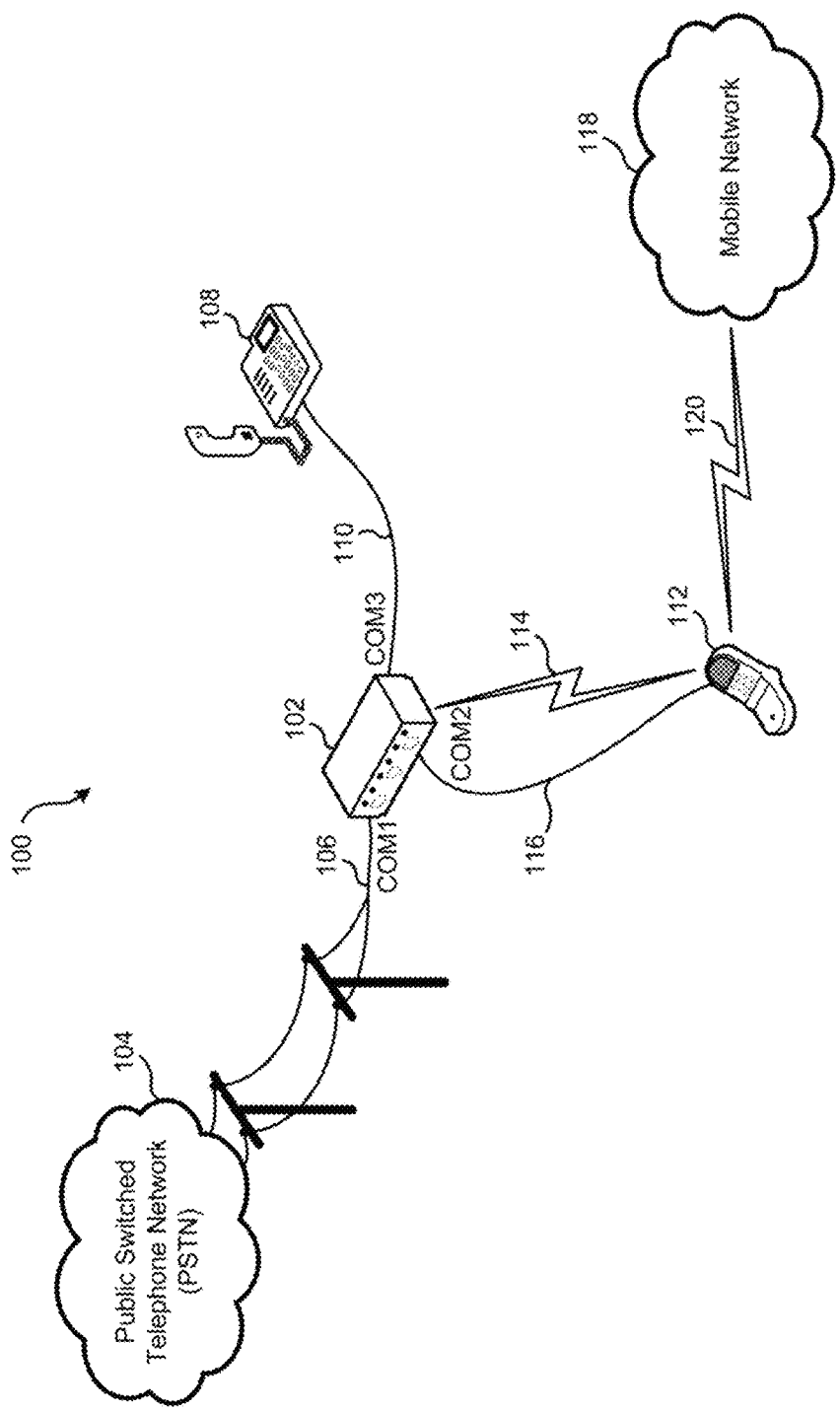
FIG. 1 depicts a system for sending and receiving telephone calls, according to one embodiment.

Various embodiments of the present invention are described in further detail below with reference to the figures, in which like items are numbered the same in the several figures.

DETAILED DESCRIPTION

The following paragraphs describe certain features and combinations of features that can be used in connection with each of the methods of the invention and embodiments, as generally described below. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation and scope including one or more meanings implied from the specification as well as one or more meanings understood by those skilled in the art and/or as defined in dictionaries, treatises, etc.

The following description is made for the purpose of illustrating the general principles of the claimed invention and is not meant to limit the inventive concepts claimed herein. Further, particular features described herein can be used in combination with other described features in each of the various possible combinations and permutations.

It must also be noted that, as used in the specification and the appended claims, the singular forms "a," "an" and "the" include plural referents unless otherwise specified.

According to one general embodiment, a system for placing and receiving telephone calls includes a telephone base station which comprises a first communication port for creating a terrestrial telephone connection for at least placing terrestrial telephone calls using a first telephone network, a second communication port for creating a link to a mobile telephone for at least placing mobile telephone calls using a second telephone network, a third communication port for creating a link to a terrestrial telephone, and a processor.

In another general embodiment, a system for placing and receiving telephone calls includes a telephone base station which comprises a first communication port for creating a terrestrial telephone connection for at least placing terrestrial telephone calls using a first telephone network, a second communication port for creating a link to a mobile telephone for at least placing mobile telephone calls using a second telephone network and a processor. The system also includes at least one handset linked to the telephone base station for telephone communications.

A system for placing and receiving telephone calls, according to another general embodiment, includes a telephone base station which comprises a first communication port for creating a terrestrial telephone connection for at least placing terrestrial telephone calls using a first telephone network, a second communication port for creating a mobile telephone connection for at least placing mobile telephone calls using a second telephone network, a third communication port for creating a link to a terrestrial telephone, and a processor, wherein the processor determines whether to send an outgoing telephone call via the terrestrial telephone connection or via the mobile telephone connection.

In another general embodiment, a system for placing and receiving telephone calls includes a telephone base station which comprises a first communication port for creating a terrestrial telephone connection for at least placing terrestrial telephone calls using a first telephone network, a second communication port for creating a mobile telephone connection for at least placing mobile telephone calls using a second telephone network, and a processor, wherein the processor determines whether to send an outgoing telephone call via the terrestrial telephone connection or via the mobile telephone connection. The system also includes at least one handset linked to the telephone base station for telephone communications.

A method for placing and receiving telephone calls, according to one general embodiment, includes establishing a first connection to a terrestrial telephone network, establishing a second connection to a terrestrial telephone, and establishing a link to a mobile telephone.

In another general embodiment, a method for placing and receiving telephone calls includes establishing a first connection to a terrestrial telephone network, establishing a second connection to a terrestrial telephone, and establishing a third connection to a mobile telephone network.

Now referring to FIG. 1, a system 100 for placing and/or receiving telephone calls is described according to one embodiment. The system 100 includes a telephone base station 102. The telephone base station 102 includes a first communication port (COM1) for creating a terrestrial telephone connection 106 for placing and/or receiving terrestrial telephone calls using a first telephone network (PSTN) 104. The telephone base station 102 also includes a second communication port (COM2) for creating a link to a mobile telephone 112 for placing and/or receiving mobile telephone calls using a second telephone network (Mobile Network) 118. The telephone base station 102 may be linked to the mobile telephone 112 via a hardwired connection 116 or via a wireless connection 114. The telephone base station 102 also includes a third communication port (COM3) for creating a link 110 to a terrestrial telephone 108. Further, the telephone base station 102 includes a processor (not shown). A processor may be any processing circuit, such as a microprocessor, application-specific integrated circuit (ASIC), field programmable gate array (FPGA), central processing unit (CPU), etc. The mobile telephone 112 may be connected to the Mobile Network 118 via a wireless connection 120.

Although the base station 102 is described with multiple ports, the functionality of multiple ports may be combined in a single communication port and/or arranged in a different manner, such as combining the functionality of two or more ports into a single port, having multiple ports performing similar functionality, such that more than one mobile telephone 112 may be connected to the telephone base station 102. In addition, more than one terrestrial telephone 108 may be connected to the telephone base station 102 such that all or some terrestrial telephones 108 in an entire home, business, etc., may be connected to the telephone base station 102.

Generally, the wireless connection 120 may be any type as is known to one of skill in the relevant art, such as 3G, 2G, CDMA, GSM, etc., and may generally be dependent on the type of mobile phone 112 and the Mobile Network provider, such as AT&T Wireless®, Verizon®, Sprint®, T-Mobile®, Metro PCS®, etc.

In some embodiments, the processor may determine if an outgoing call is local or long distance. A local call may be considered any telephone call which is destined for the same area code as the area code where the call is being placed, a call for which no additional toll is assessed, calls to telephone numbers not designated as long distance numbers, etc. A long distance call may be considered any call to an area code different from the originating area code, a call for which a toll is assessed, calls to telephone numbers designated as long distance numbers, etc. Additionally, the processor may cause an outgoing long distance call to be placed via the mobile telephone link 114, 116 and may cause an outgoing local call to be placed via the terrestrial telephone connection 106. For convenience, incoming calls may be passed to the terrestrial telephone 108, and outgoing calls may be generated from the terrestrial telephone 108. However, incoming and outgoing calls may also be received and sent, respectively, from the mobile telephone 112, or both 108, 112.

In more embodiments, the base station 102 may receive and pass an incoming telephone call received by the mobile telephone 112 to the third communication port (COM3). In this fashion, an incoming call received by the mobile telephone 112 may be answered on a different handset than the mobile telephone, thereby allowing for use of a more convenient handset, e.g., the handset on a terrestrial telephone. Since most homeowners who receive terrestrial telephone service have terrestrial handsets (e.g., home telephones) dispersed throughout the home in convenient locations, it is generally easier to answer any of the home telephones rather than locating, answering, and conducting a conversation on a single mobile telephone 112, which may be in a pocket, in another room, plugged in for charging, in a bag or backpack, etc.

The base station 102, according to some embodiments, may recognize when the mobile telephone 112 is within about 100 feet of the base station 102. This way, the base station 102 may ring when an incoming telephone call is received, and additionally the mobile telephone 112 may not ring when it is within about 100 feet of the base station 102. Of course, the mobile telephone 112 may also recognize when it is within a certain distance from the base station 102. Also, the distance may be greater or less than 100 feet, and this distance is only exemplary. Other distances may be recognized as well, such as 3 feet, 10 feet, 50 feet, 200 feet, etc. Also, the telephone base station 102 may ring all phones when an incoming call is received, or may ring only the last type of phone used, or may ring a predetermined handset, etc.

In some more embodiments, the base station 102 may recognize when a link 114, 116 to the mobile telephone 112 has been established. In this way, the base station may recognize when to pass an incoming call from the mobile telephone 112 to a terrestrial telephone 108, and/or an outgoing call form the terrestrial telephone 108 to the mobile telephone 112. For example, if the mobile telephone 112 is not linked to the base station 102, then presumably the link to the mobile phone network is not available and the phone call may be placed using the terrestrial telephone connection 106.

In some embodiments, the hardwired link 116 to the mobile telephone 112 may be via USB. Firewire, serial connection, Ethernet, HDMI, dock or docking station, etc. Any connection as would be known to one of skill in the relevant art that uses a physical connection to the mobile telephone 112 may be used. Moreover, the path of the hardwired link 116 to the mobile telephone 112 may include additional hardware such as an uplink, charging station, etc.

Also, according to some embodiments, the wireless link 114 to the mobile telephone 112 may be via Bluetooth, IR, RF, Ethernet, Wi-Fi, WWAN, WLAN, etc. Any connection as would be known to one of skill in the relevant art that does not require a physical connection to the mobile telephone 112 may be used. Additionally, one or both of the hardwired 116 and wireless 114 links may be used at any one given time. Moreover, the path of the wireless link 114 to the mobile telephone 112 may include additional hardware such as a wireless router, uplink, partial wired connection (e.g., a cable from the base station 102 to a wireless router), etc.

In more approaches, the base station 102 may include a display (not shown) which may include call related information, such as, but not limited to, the telephone number dialed or received, a name associated with the telephone number, a picture associated with the telephone number, length of call, time of call, cost of call, time of day, line used, date, Caller ID, etc.

Figure 2:
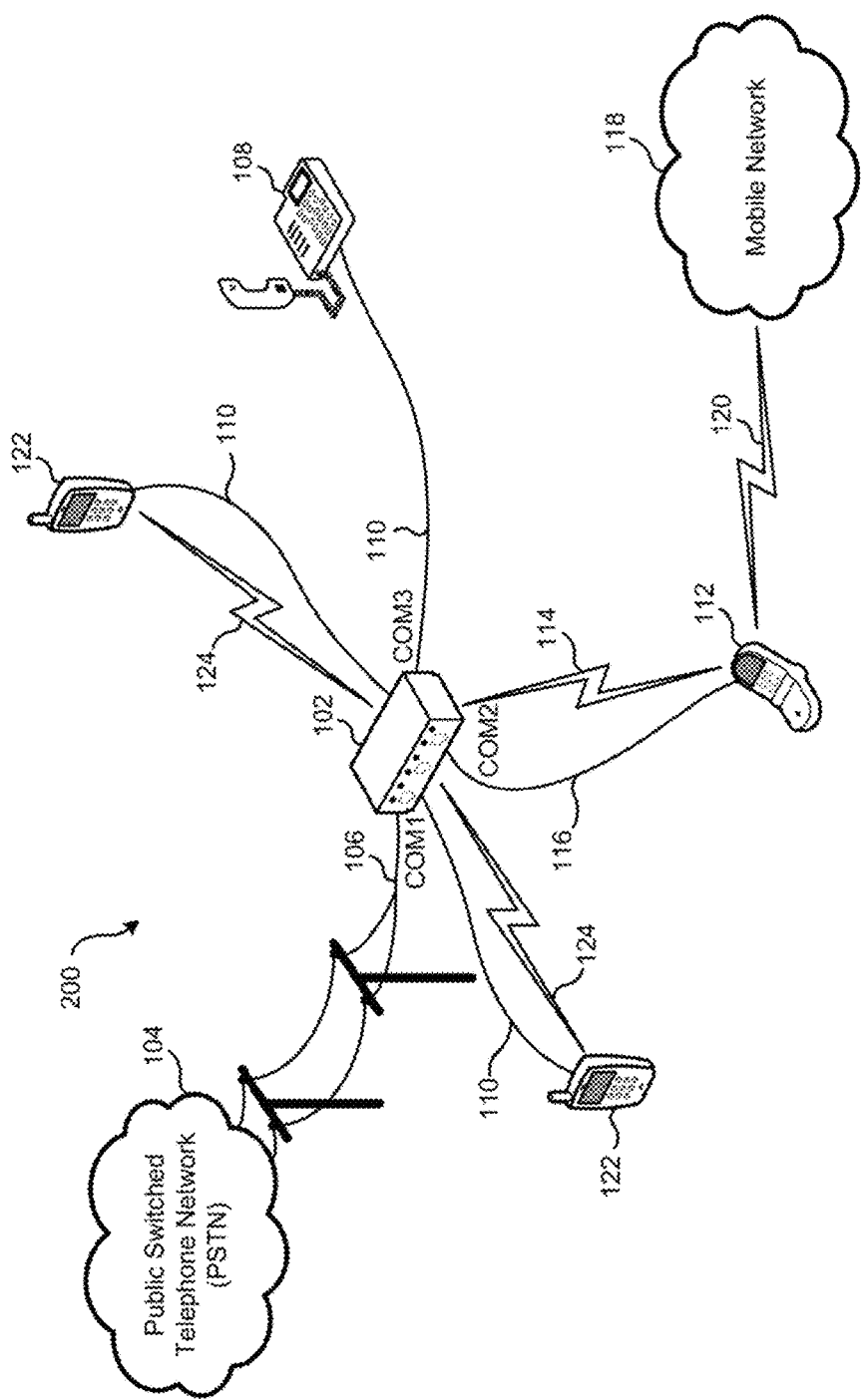
FIG. 2 depicts a system for sending and receiving telephone calls, according to one embodiment.

Now referring to FIG. 2, another embodiment of the system 200 for sending and receiving telephone calls is shown. Any of the previous descriptions of FIG. 1, along with any objects, signals, features, etc. used in FIG. 1, may be included in the description of FIG. 2.

In FIG. 2, the base station 102 is shown including additional connections to two handsets 122. The handsets 122 may be connected via a hardwire connection 110 and/or via a wireless connection 124. Any type of hardwired and/or wireless connection may be used as would be known to one of ordinary skill in the relevant art, including those types previously discussed in the description of FIG. 1. Of course, more or less handsets 122 may be linked to the base station 102, such as 1, 3, 4, 10, etc. handsets 122. Each handset may be used to receive incoming calls and place outgoing calls on the first network (PSTN) 104 and/or the second network (Mobile Network) 118.

In some embodiments, one or more handsets 122 may have access to the terrestrial telephone connection 106 and the mobile telephone link 114, 116 for sending and receiving calls. Furthermore, one or more handsets 122 may ring when an incoming call is received via the mobile telephone link 114, 116. Also, the incoming call received via the mobile telephone link 114, 116 may be passed to the one or more handsets 122.

In more embodiments, one or more handsets 122 may ring when an incoming call is received via the terrestrial telephone connection 106. Additionally, the incoming call received via the terrestrial telephone connection 106 may be passed to the one or more handsets 122, as well as the mobile phone 112.

In some embodiments, each handset 122 may include features such as a rechargeable battery, a display for showing information (such as call information, phone numbers, contact details, battery life left, signal strength, etc.) buttons for dialing numbers and entering alphanumeric characters, an antenna for linking to the base station 102, a communication port for hardwired connection to the base station 102, a headphone jack, Bluetooth capability, USB connection, microphone, speaker, etc.

One or more of the handsets 122, according to one embodiment, may also be able to communicate to one another (directly or through the base station 102) without using either the first network 104 or the second network 118. Also, in some embodiments, one or more of the handsets 122 may include a memory and a processor. The memory may be used to store incoming and outgoing call lists, contact numbers and details (such as would be found in a contact list in Microsoft Outlook®, on a mobile telephone, in an address book, etc.), caller ID information, etc.

Figure 3:
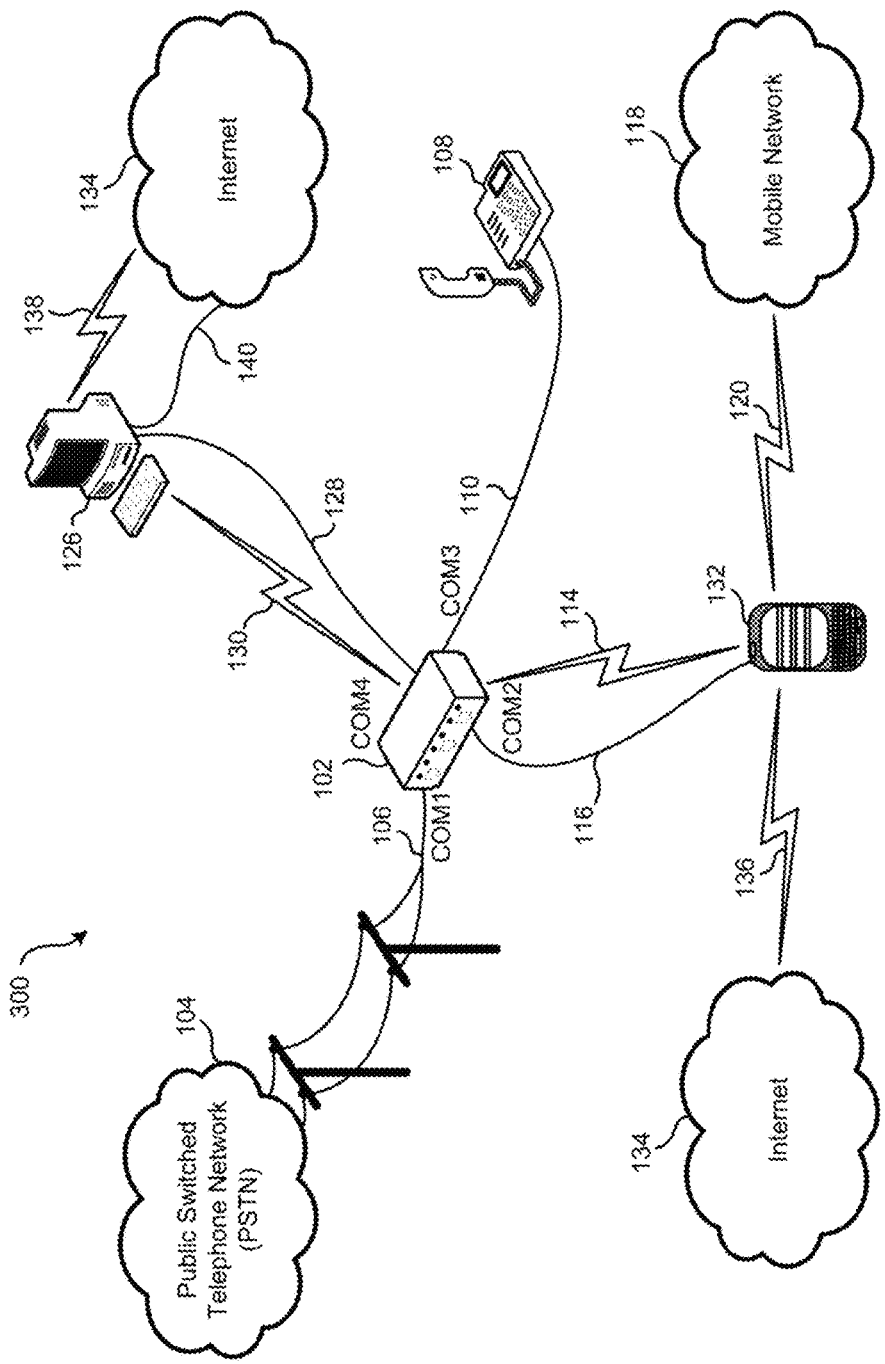
FIG. 3 depicts a system for sending and receiving telephone calls, according to one embodiment.

Now referring to FIG. 3, another embodiment of the system 300 for sending and receiving telephone calls is shown. Any of the previous descriptions of FIGS. 1 and 2, along with any objects, signals, features, etc. used in FIGS. 1 and 2, may be included in the description of FIG. 3.

FIG. 3 includes a base station 102 which includes an additional connection port (COM4) that allows communication with a computer 126 via a link 128, 130. In some embodiments, the hardwired link 128 to the computer 126 may be via USB, Firewire, serial connection, Ethernet, HDMI, dock or docking station, etc. Any connection as would be known to one of skill in the relevant art that uses a physical connection to the computer 126 may be used. Moreover, the path of the hardwired link 128 to the computer 126 may include additional hardware such as an uplink, router, etc.

Although the base station 102 is described with multiple ports, the functionality of multiple ports may be combined in a single communication port and/or arranged in a different manner.

Also, according to some embodiments, the wireless link 130 to the computer 126 may be via Bluetooth, IR, RF, Ethernet, Wi-Fi, WWAN, WLAN, etc. Any connection as would be known to one of skill in the relevant art that does not require a physical connection to the computer 126 may be used. Additionally, one or both of the hardwired 128 and wireless 130 links may be used at any one given time. Moreover, the path of the wireless link 130 to the computer 126 may include additional hardware such as a wireless router, uplink, partial wired connection (e.g., a cable from the base station 102 to a wireless router), etc.

In a further embodiment, the mobile telephone 132 may connect to the base station 102 via the computer 126, regardless of the presence or absence of links 114, 116. In some approaches, the mobile telephone 132 may communicate with the computer 126 via Bluetooth, Wi-Fi, serial cable, etc. The computer 126 in turn relays the call information to and from the base station 102.

According to some embodiments, data may be exchanged between the computer 126 and the base station 102. Additionally, data may be exchanged between the computer 126 and the mobile telephone 132. Also, data may be exchanged between the mobile telephone 132 and the base station 102. If any handsets are connected to the base station, data may be exchanged with any of the handsets as well.

In further approaches, the data which may be exchanged includes any data as would be known to one of skill in the relevant art, such as a calendar file and/or portions thereof, a contact list and/or portions thereof, a music file, a video file, etc. In one preferred embodiment, the mobile telephone 132, the base station 102, and the computer 126 may synchronize a contact list stored on each device, such that when a contact is edited, deleted, or added on any one device, the change may be reflected on all the devices. Of course, a user may be able to select which changes are reflected, on which devices, and any other details of the synchronization, such as a regular synchronization schedule, archiving, sharing incoming and outgoing call lists, etc.

Also, in some embodiments, the computer 126 may be connected to the Internet 134. The connection may be via a hardwired connection 140 and/or a wireless connection 138, either of which may include additional hardware such as a modem, router, etc. In some more embodiments, the mobile telephone 132 may be connected to the Internet 134 via a wireless connection 136. The computer 126 and the mobile telephone 132 may be able to share web browser settings, such as favorites, visited sites, cookies, etc. Also, the mobile telephone 132, when linked to the base station 102, may be able to access the Internet 134 via the link to the computer 126 through the base station 102. This is useful when the computer 126 has a faster connection 138, 140 to the Internet 134 than does the mobile telephone 132, thereby allowing a user to use this faster connection even when accessing the Internet 134 on the mobile telephone 132.

Figure 4:
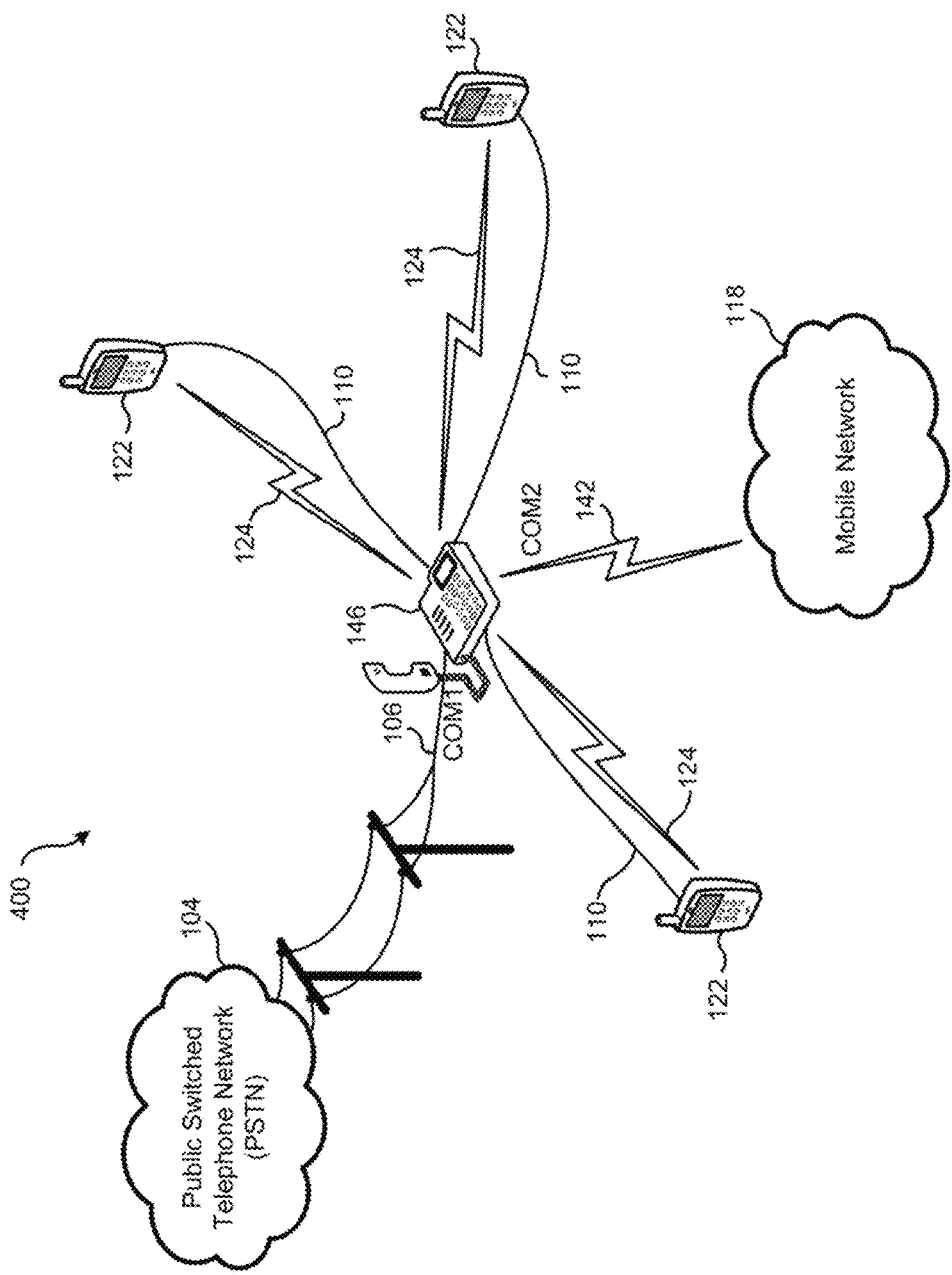
FIG. 4 depicts a system for sending and receiving telephone calls, according to one embodiment.

Now referring to FIG. 4, a system 400 for sending and receiving telephone calls is shown according to another embodiment. Any of the previous descriptions of FIGS. 1-3, along with any objects, signals, features, etc. used in FIGS. 1-3, may be included in the description of FIG. 4.

In this embodiment, the system 400 includes a base station 146 which may include a handset for placing and/or receiving telephone calls. The base station 146 includes a first communication port (COM1) for creating a terrestrial telephone connection 106 for placing and/or receiving terrestrial telephone calls using a first telephone network (PSTN) 104. The base station 146 also includes a second communication port (COM2) for creating a mobile telephone connection 142 for placing and/or receiving mobile telephone calls using a second telephone network (Mobile Network) 118. Additionally, the base station 146 includes a processor (not shown). A processor may be any processing circuit, such as a microprocessor, application-specific integrated circuit (ASIC), field programmable gate array (FPGA), central processing unit (CPU), etc. The processor determines whether to send an outgoing telephone call via the terrestrial telephone connection 106 or via the mobile telephone connection 142.

Although the base station 146 is described with multiple ports, the functionality of multiple ports may be combined in a single communication port and/or arranged in a different manner.

The unique feature of the system 400 in this embodiment in contrast to the previously described embodiments is that the system 400 connects to a second network (Mobile Network) 118 without the use of a separate mobile telephone. Therefore, the base station 146 may include a Subscriber Identity Module (SIM) card and electronics capable of acquiring a connection to a Mobile Network 118. Also, a service provider may provide service to the base station 146 as would be provided to any other mobile telephone. Thus, phone calls may also be received directly by the base station 146 via the mobile telephone connection 142.

Also, according to some embodiments, the base station 146 may include a display for showing information (such as call information, phone numbers, contact details, battery life left, signal strength, handset 122 availability, etc.) buttons for dialing numbers and entering alphanumeric characters, an antenna for linking to the handsets 122, an antenna for connecting to the second network (Mobile Network) 118, a communication port for hardwired connection to the first network (PSTN) 104, a headphone jack, Bluetooth capability, etc.

In some embodiments, the base station 146 or 102 may determine whether to connect an outgoing call via the mobile telephone connection 142 or 114, or the terrestrial telephone connection 106 based on factors. The factors on which this decision may be based include any of the following: an availability of the mobile telephone connection 142, an availability of the terrestrial telephone connection 106, a type of outgoing call, a cost of placing the outgoing call on the mobile telephone network 118, a cost of placing the outgoing call on the terrestrial telephone network 104, a quality of connection via the mobile telephone network 118, a quality of connection via the terrestrial telephone network 106, a number of minutes remaining on a mobile telephone account, etc. Of course, many more factors would be apparent to one of ordinary skill in the relevant art, and may be used to determine which connection to use to send an outgoing call.

Figure 5:
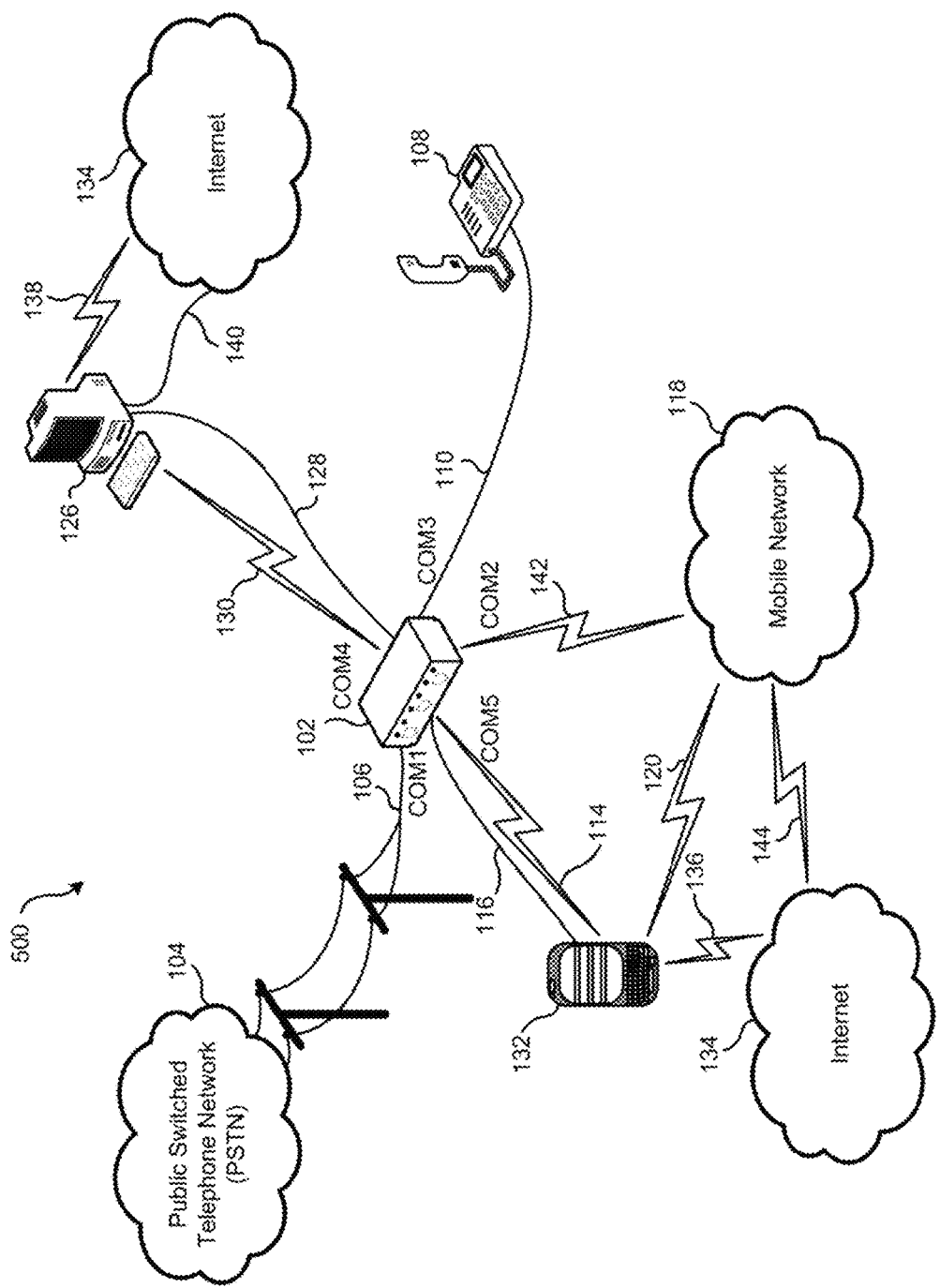
FIG. 5 depicts a system for sending and receiving telephone calls, according to one embodiment.

Now referring to FIG. 5, a system 500 for sending and receiving telephone calls is shown according to another embodiment. Any of the previous descriptions of FIGS. 1-4, along with any objects, signals, features, etc. used in FIGS. 1-4, may be included in the description of FIG. 5.

In this embodiment, the system 500 for sending and receiving telephone calls includes a base station 102 which includes a first communication port (COM1) for creating a terrestrial telephone connection 106 for placing and/or receiving terrestrial telephone calls using a first telephone network (PSTN) 104. The base station 102 also includes a second communication port (COM2) for creating a mobile telephone connection 142 for placing and/or receiving mobile telephone calls using a second telephone network (Mobile Network) 118. Additionally, the base station 102 includes a third communication port (COM3) for creating a link 110 to a terrestrial telephone 108, and a processor (not shown). A processor may be any processing circuit, such as a microprocessor, application-specific integrated circuit (ASIC), field programmable gate array (FPGA), central processing unit (CPU), etc. The processor may determine whether to send an outgoing telephone call via the terrestrial telephone connection 106 or via the mobile telephone connection 142.

In some embodiments, the base station 102 may further include a fourth communication port (COM4) for creating a link 128, 130 to a computer 126. The link may be hardwired 128 or wireless 130, as would be known to one of skill in the art. The computer 126 may be connected to the Internet 134 via a connection 138, 140. The connection may be hardwired 128 or wireless 130, as would be known to one of skill in the art.

In preferred embodiments, data may be exchanged between some or all of the devices connected to or linked with the system 500, including the computer 126, the mobile telephone 132, and the base station 102. The type of data and circumstances for exchanging data has been previously discussed, and apply here as well.

Also, in some embodiments, the base station 102 may include a fifth communication port (COM5) for creating a link 114, 116 to a mobile telephone 132, wherein the base station 102 recognizes when the link 114, 116 to the mobile telephone 132 has been established. Also, the base station 102 may recognize when the mobile telephone 132 is within about 100 feet of the base station 102. Of course, any distance may be set from which the base station 102 may determine a proximity of the mobile telephone 132, and the embodiment is not meant to be limited to 100 feet only. Other distances may be detected as well, such as 5 feet, 10 feet, 20 feet, 50 feet, within the confines of a building (such as a home, business, office, etc.), within range of the antenna on the base station 102, etc.

Although the base station 102 is described with multiple ports, the functionality of multiple ports may be combined in a single communication port and/or arranged in a different manner.

According to some embodiments, the base station 102 may receive and pass an incoming telephone call received via the mobile telephone connection 142 to the third communication port (COM3), such that the incoming telephone call may be answered on the terrestrial telephone 108.

As previously discussed, any of the links and connections may be via any technology as would be known to one of skill in the art, such as Bluetooth, USB, Firewire, IR, RF, Ethernet, serial connection, Wi-Fi, WWAN, WLAN, etc.

Figure 6:
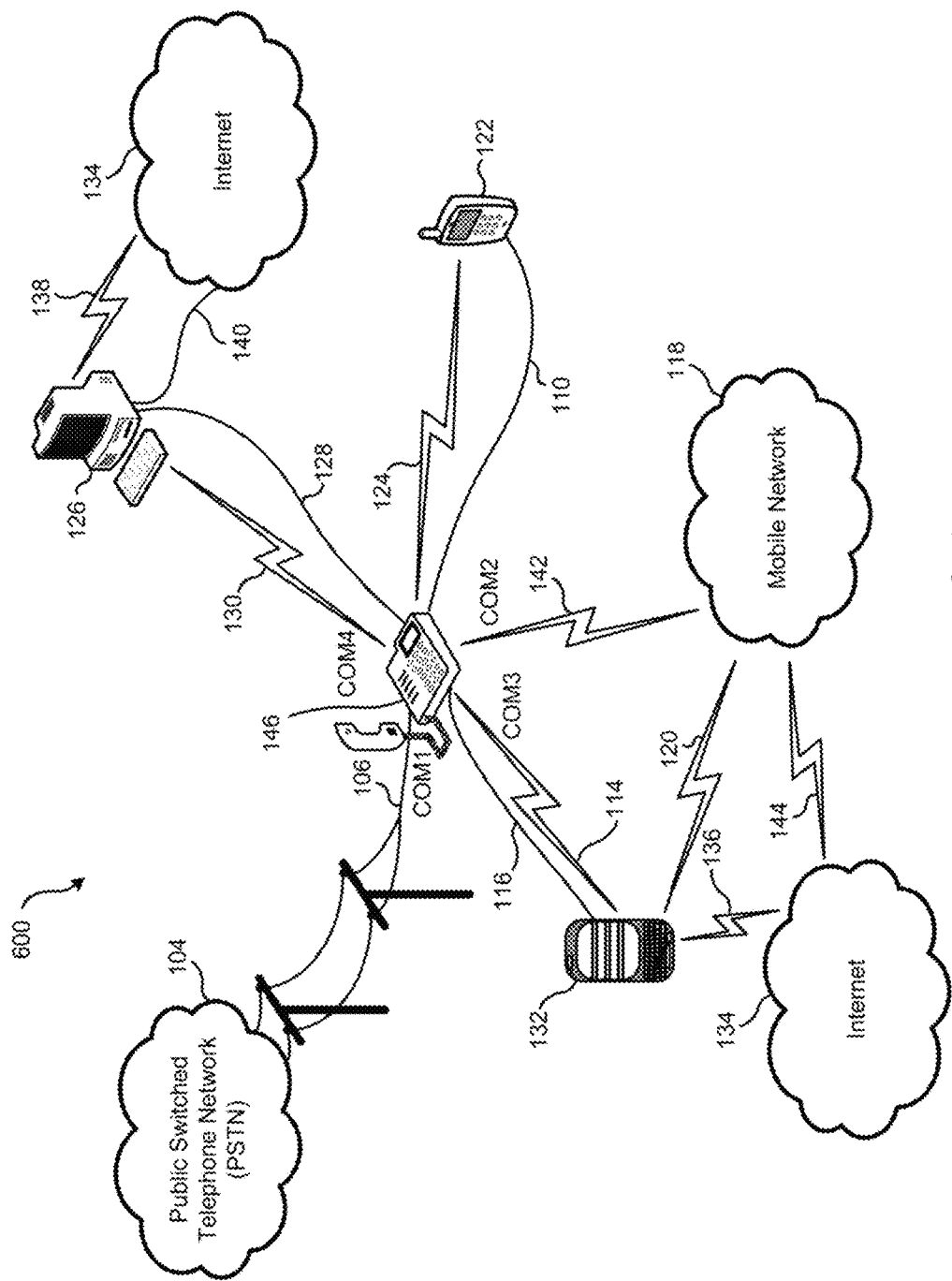
FIG. 6 depicts a system for sending and receiving telephone calls, according to one embodiment.

Now referring to FIG. 6, a system 600 for sending and receiving telephone calls is shown according to another embodiment. Any of the previous descriptions of FIGS. 1-5, along with any objects, signals, features, etc. used in FIGS. 1-5, may be included in the description of FIG. 6.

In FIG. 6, the system 600 for sending and receiving telephone calls includes a base station 146 which includes a first communication port (COM1) for creating a terrestrial telephone connection 106 for placing and/or receiving terrestrial telephone calls using a first telephone network (PSTN) 104. The base station 146 also includes a second communication port (COM2) for creating a mobile telephone connection 142 for placing and/or receiving mobile telephone calls using a second telephone network (Mobile Network) 118. Additionally, the base station 146 includes a third communication port (COM3) for creating a link 110 to a terrestrial telephone 108, and a processor (not shown). A processor may be any processing circuit, such as a microprocessor, application-specific integrated circuit (ASIC), field programmable gate array (FPGA), central processing unit (CPU), etc. The processor determines whether to send an outgoing telephone call via the terrestrial telephone connection 106 or via the mobile telephone connection 142. The system 600 also includes at least one handset 122 linked to the telephone base station 146 for telephone communications, via a hardwired link 110 and/or a wireless link 124.

In some embodiments, the base station 146 may further include a fourth communication port (COM4) for creating a link 128, 130 to a computer 126. The link may be hardwired 128 or wireless 130, as would be known to one of skill in the art. The computer 126 may be connected to the Internet 134 via a connection 138, 140. The connection may be hardwired 128 or wireless 130, as would be known to one of skill in the art.

Also, in some embodiments, the base station 146 may include a fifth communication port (COM5) for creating a link 114, 116 to a mobile telephone 132, wherein the base station 146 recognizes when the link 114, 116 to the mobile telephone 132 has been established.

Although the base station 146 is described with multiple ports, the functionality of multiple ports may be combined in a single communication port and/or arranged in a different manner.

Also, according to some embodiments, the telephone base station 146 may include a single telephone number for receiving incoming telephone calls via the mobile telephone connection 142 and the terrestrial telephone connection 106. For example, the mobile telephone 132 and the base station may both receive an incoming call when a telephone number is dialed. In some further embodiments, the base station 146 may determine whether to ring the mobile telephone 132 based on a proximity of the mobile telephone 132. In still more embodiments, the base station may ring one or more handsets 122 only if the mobile telephone is within a certain proximity of the base station 146, and may ring only the mobile telephone 132 if the mobile telephone is not within a certain proximity. Also, voice mail may be available on the mobile telephone 132 and the base station 146 and each handset 122.

In yet other embodiments, which may have similar features as those in other embodiments presented herein, there is no connection to a land line, or the connection is optional. In the latter case, for example, a COM port may be provided on the base station for optional connection to a terrestrial telephone connection if one is available. Accordingly, voice communication, and optionally data communication, may all go through the mobile network, or selectively through the mobile network and another non-PSTN network such as the internet, Wi-Fi network, etc.

In further embodiments, which may have similar features as those in other embodiments presented herein, the base station may select one of a mobile network connection and a voice over internet protocol (VOIP) connection to place a given call based on factors similar to those presented above.

In yet further embodiments, which may have similar features as those in other embodiments presented herein, the base station may select one of a terrestrial telephone connection, a mobile network connection, and a voice over internet protocol (VOIP) connection to place a given call based on factors similar to those presented above.

In additional embodiments, the system may connect to a satellite network for voice and/or data communication.

In some embodiments, other devices such as facsimile machines, answering machines, security systems, etc. may be connected to the system. For devices that may not function properly over a mobile network, such as some facsimile machines, the system may send data signals from such devices to the terrestrial telephone connection.

In another approach, the system may determine whether a desired network is available, and if it is not, then an available network is selected. This may be particularly useful in areas where a mobile tower cannot handle all connection requests coming to it.

Figure 7:
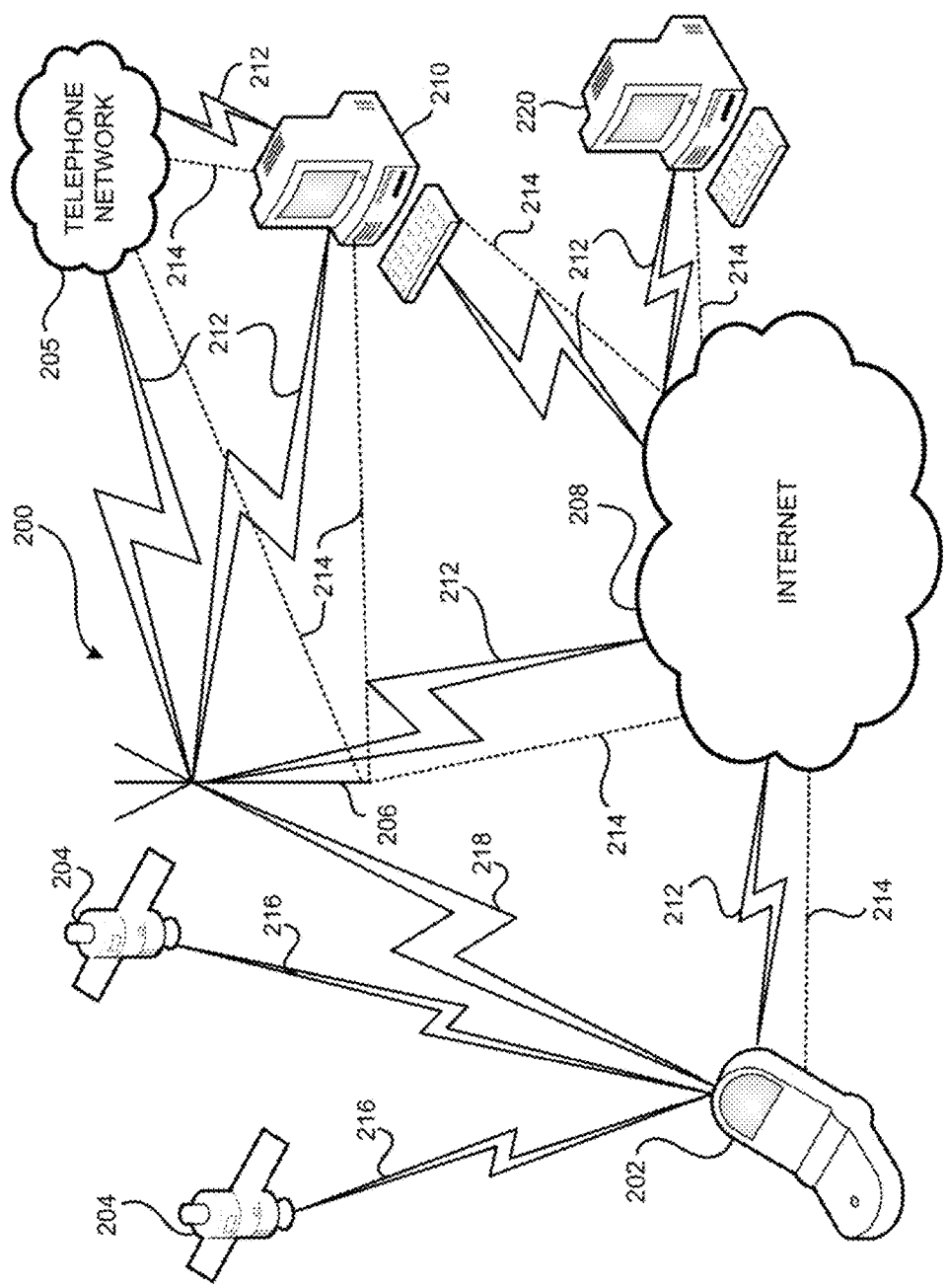
FIG. 7 depicts an environment in which the system according to any embodiment may be used, according to one embodiment.

With reference to FIG. 7, an environment 200 in which a system for sending and receiving telephone calls may be used is shown according to one embodiment. The system may be present at any of the nodes or along any of the communication links presented therein except the satellites 204. A mobile phone 202, such as a mobile phone according to one of the embodiments described herein, may connect to a telephone network 205 for communication with other mobile and terrestrial devices. The mobile phone 202 may also connect to a server computer or switch, referred to hereinafter as server computer 210, through any number of hardwired links 214 and/or wireless links 212, 218. Generally, the mobile phone 202 connects to a local tower 206 through a wireless connection 218, and the tower 206 connects to the telephone network 205 and/or server computer 210. Additionally, the mobile phone 202 may connect to the internet 208 through a connection with the tower 206 and/or a server computer 210. The internet 208 may also provide a link from the mobile phone 202 to other servers or computers 220 through wireless links 212 and/or hardwired links 214. The mobile phone 202 may also connect via wireless links 216 to one or more satellites 204 for communication (e.g., satellite telephony) and/or location functionality (e.g., via global positioning service (GPS), etc.). In some embodiments, the mobile phone 202 may connect to the internet via a hardwired and/or other wireless link, e.g., WiFi connection, Bluetooth, etc. The program environment in which a present embodiment of the invention may be executed illustratively incorporates one or more general-purpose computers or special-purpose devices. Details of such devices (e.g., processor, memory, data storage, input and/or output devices) are well known and are omitted for the sake of clarity.

Figure 8:
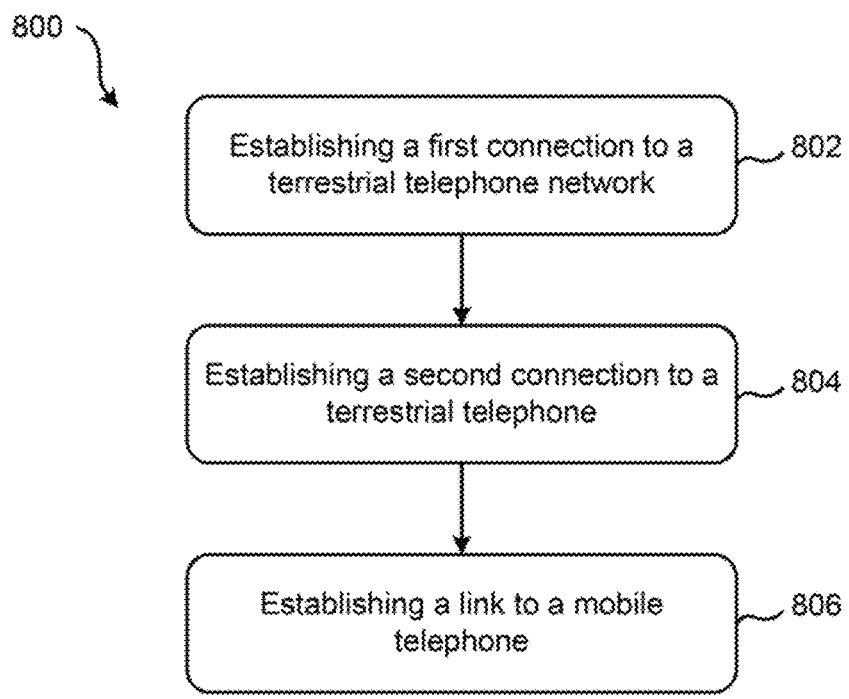
FIG. 8 shows a flowchart of a method, according to one embodiment.

Now referring to FIG. 8, a method 800 is shown according to one embodiment. The method 800 may be carried out in any desired environment, including but not limited to the environment shown in FIG. 7.

In operation 802, a first connection to a terrestrial telephone network is established. For example, a link may be established by plugging into a phone jack located near a baseboard in a residential home which is receiving telephone service from a local telephone provider.

In operation 804, a second connection to a terrestrial telephone is established. For example, a cordless or corded telephone may be connected, such that the telephone is capable of accessing the terrestrial telephone network. This may also include activating or energizing a handset built into the base station, as shown in FIG. 4.

In operation 806, a link to a mobile telephone is established. For example, a hardwired or wireless link may be established, such as a link via Bluetooth, USB, Firewire, IR, RF, Ethernet, serial connection, Wi-Fi, WWAN, WLAN, etc.

In some embodiments, the method 800 may further comprise receiving an incoming call via the terrestrial telephone connection, receiving an incoming call via the mobile telephone link, placing an outgoing call via the terrestrial telephone connection, and/or placing an outgoing call via the mobile telephone link.

In some preferred embodiments, the method 800 may further comprise determining if an outgoing call is local or long distance. Then, the outgoing call may be sent via the mobile telephone link if the outgoing call is long distance. Also, the outgoing call may be sent via the terrestrial telephone connection if the outgoing call is local.

Additionally, the determination of whether to send an outgoing call via the mobile telephone link or the terrestrial telephone connection may be based on factors. The factors may include one or more of the following: an availability of the mobile telephone link, an availability of the terrestrial telephone connection, a type of outgoing call, a cost of placing the outgoing call on the mobile telephone network, a cost of placing the outgoing call on the terrestrial telephone network, a quality of connection via the mobile telephone network, a quality of connection via the terrestrial telephone network, and a number of minutes remaining on a mobile telephone account.

The method 800 may also include passing an incoming call received via the terrestrial telephone connection from a base station to at least one handset for telephone communications and/or passing an incoming call received via the mobile telephone link from a base station to at least one handset for telephone communications. Of course, the method 800 may include providing at least one handset, wherein the at least one handset has access to the terrestrial telephone connection and the mobile telephone link. In these embodiments, the at least one handset may ring when an incoming call is received via the mobile telephone link and/or when an incoming call is received via the terrestrial telephone connection.

In some more embodiments, the terrestrial telephone may ring when an incoming call is received on the terrestrial telephone connection and/or when an incoming call is received on the mobile telephone link.

Figure 9:
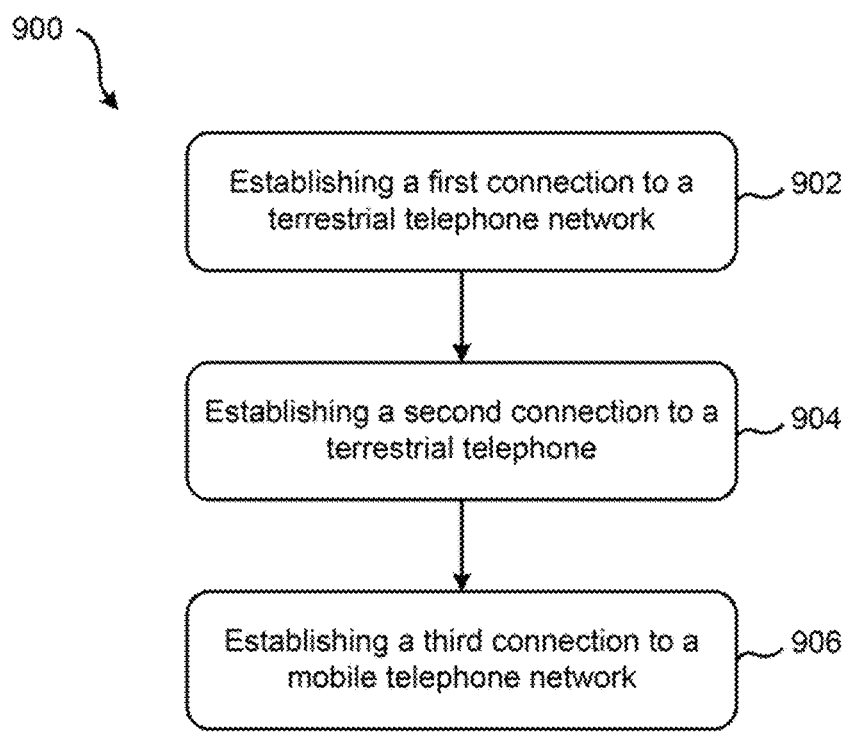
FIG. 9 shows a flowchart of a method, according to one embodiment.

Now referring to FIG. 9, a method 900 is shown according to one embodiment. The method 900 may be carried out in any desired environment, including but not limited to the environment shown in FIG. 7.

In operation 902, a first connection to a terrestrial telephone network is established. For example, a link may be established by plugging into a phone jack located near a baseboard in a residential home which is receiving telephone service from a local telephone provider.

In operation 904, a second connection to a terrestrial telephone is established. For example, a cordless or corded telephone may be connected, such that the telephone is capable of accessing the terrestrial telephone network. This may also include activating or energizing a handset built into the base station, as shown in FIG. 4.

In operation 906, a third connection to a mobile telephone network is established. For example, a wireless link may be established, such as a link via Bluetooth, RF, Wi-Fi, WWAN, WLAN, 2 G, 3G, GSM, CDMA, etc.

In some embodiments, the method 900 may further comprise receiving an incoming call via the terrestrial telephone connection, receiving an incoming call via the mobile telephone connection, placing an outgoing call via the terrestrial telephone connection, and/or placing an outgoing call via the mobile telephone connection.

In some preferred embodiments, the method 900 may further comprise determining if an outgoing call is local or long distance. Then, the outgoing call may be sent via the mobile telephone connection if the outgoing call is long distance. Also, the outgoing call may be sent via the terrestrial telephone connection if the outgoing call is local.

Additionally, the determination of whether to send an outgoing call via the mobile telephone connection or the terrestrial telephone connection may be based on factors. The factors may include one or more of the following: an availability of the mobile telephone connection, an availability of the terrestrial telephone connection, a type of outgoing call, a cost of placing the outgoing call on the mobile telephone network, a cost of placing the outgoing call on the terrestrial telephone network, a quality of connection via the mobile telephone network, a quality of connection via the terrestrial telephone network, and a number of minutes remaining on a mobile telephone account.

The method 900 may also include passing an incoming call received via the terrestrial telephone connection from a base station to at least one handset for telephone communications and/or passing an incoming call received via the mobile telephone connection from a base station to at least one handset for telephone communications. Of course, the method 900 may include providing at least one handset, wherein the at least one handset has access to the terrestrial telephone connection and the mobile telephone connection. In these embodiments, the at least one handset may ring when an incoming call is received via the mobile telephone connection and/or when an incoming call is received via the terrestrial telephone connection.

Preferably, the methods 800, 900 are performed using a single hardware device such as the aforementioned base station. Alternatively, the methods may be performed using multiple pieces of hardware that are in communication with each other. Thus, in the latter case, the pieces of hardware may be a system comprising a base station and other devices; or the devices may be collectively considered to be a base station.

Figure 10:
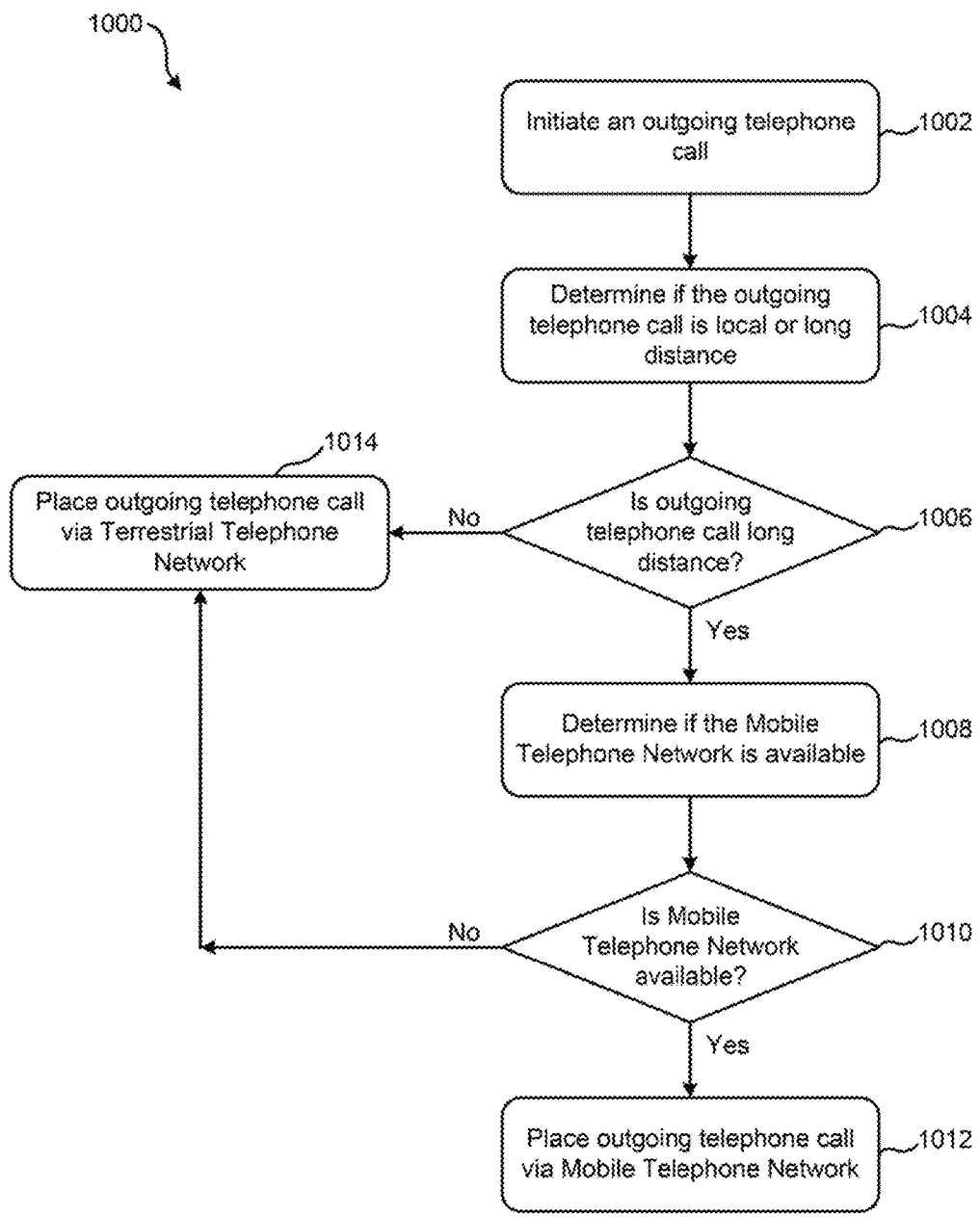
FIG. 10 shows a flowchart of a method, according to one embodiment.

In FIG. 10, a method 1000 is shown according to one embodiment. The method may be carried out in any desired environment, including those shown in FIGS. 1-7.

In operation 1002, an outgoing telephone call is initiated. This may be performed, by dialing a telephone number, including an area code and country code, if applicable, on a handset, a terrestrial telephone, or a mobile telephone.

In operation 1004, it is determined if the outgoing telephone call is local or long distance. This may be determined, at least in part, on the area code and/or country code dialed.

In operation 1006, if the outgoing call is long distance, the method 1000 proceeds to operation 1008. If the outgoing telephone call is not long distance (e.g., a local telephone call), the method 1000 proceeds to operation 1014.

In operation 1008, it is determined if the Mobile Telephone Network is available, e.g., the network is accessible and a telephone call may be placed, including checking an available amount of minutes in a mobile telephone account.

In operation 1010, if the Mobile Telephone Network is available, the method 1000 proceeds to operation 1012. If the Mobile Telephone Network is not available, the method proceeds to operation 1014.

In operation 1012, the outgoing telephone call is placed via the Mobile Telephone Network. This may save money for a user since long distance calls are generally not charged extra on a mobile network.

In operation 1014, the outgoing telephone call is placed via the Terrestrial Telephone Network. This may save money since generally, terrestrial local calls are not charged toll or usage charges.

Of course, more or alternate steps may be included in the method 1000 as seen fit by a person of ordinary skill in the art. For example, in addition or in the alternative, operation 1008 may include determining whether a call made using the Mobile Telephone Network is more or less expensive than making the call using the Terrestrial Telephone Network. In operation 1010, then, the less expensive option is selected.

In some more embodiments, the terrestrial telephone may ring when an incoming call is received on the terrestrial telephone connection and/or when an incoming call is received on the mobile telephone connection.

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

What is claimed is:

1. A system, comprising:
a base station wirelessly connected to a first handset and a second handset, the base station comprising:
a first communication port configured to create a wireless connection to a first mobile telephone and a second mobile telephone via Bluetooth, where the first mobile telephone uses a first mobile telephone network and the second mobile telephone uses a second mobile telephone network, and where the first mobile telephone network is a GSM network, and the second mobile telephone network is a CDMA network;
a second communication port configured to create a terrestrial telephone connection to a first telephone network;
a processing circuit coupled to the first communication port and the second communication port; and
a display;
wherein the base station is configured to provide voice communications between the first handset and the second handset without using the first mobile telephone network, the second mobile telephone network, or the first telephone network;
wherein the base station retrieves a first contact list from the first mobile telephone and a second contact list from the second mobile telephone, and sends information from the first contact list and the second contact list to a memory of the first handset and the second handset;
wherein the base station is configured to receive a first incoming call via the first communication port, and send the first incoming call to one or more of the first handset and the second handset;
wherein the base station is configured to receive a second incoming call via the second communication port, and send the second incoming call to one or more of the first handset and the second handset;
wherein the base station is configured to receive a request to place an outgoing call from the first handset or the second handset, determine whether the outgoing call is to be sent via the first mobile telephone network, the second mobile telephone network, or the first telephone network, based on one or more factors, and select one of the first mobile telephone network, the second mobile telephone network, or the first telephone network for sending the outgoing call;
wherein the base station receives the first incoming call via the first mobile telephone, determines a wireless proximity of the first mobile telephone to the base station, and sends the first incoming call to one or more of the first handset and the second handset, only when the wireless proximity of the first mobile telephone is within a predetermined wireless proximity to the base station;
wherein the first handset and the second handset each include:
a display for showing call information, phone numbers, contact details, and battery life, and
the memory for storing the first contact list, the second contact list, and an incoming call list.

2. The system of claim 1, wherein the first handset and the second handset further include: a rechargeable battery, buttons for dialing numbers, and an antenna for linking to the base station.

3. The system of claim 1, wherein the base station is further configured to show a signal strength of a mobile network, a time of day, and a current date on a display of the base station.

4. The system of claim 3, wherein the base station is further configured to output on the display an amount of battery life remaining for the first and second mobile telephones.

5. A system, comprising:
a base station, comprising:
a first communication port configured to create a wireless connection to a computer,
a second communication port configured to create a wireless link to a mobile telephone network;
a third communication port configured to create a hardwired link to a terrestrial telephone;
a fourth communication port configured to create a wireless connection to a mobile telephone;
a fifth communication port configured to create a terrestrial telephone connection to a second telephone network;
a processing circuit coupled to the communication ports;
a mobile telephone coupled to the fourth communication port;
a terrestrial telephone coupled to the third communication port; and
a display coupled to the processing circuit,
the base station being configured to show a signal strength of the mobile network, an amount of battery life remaining for the mobile telephone, an amount of battery life remaining for the terrestrial telephone, and the terrestrial telephone, and information associated with an incoming call received by the base station on the display, the information being selected from the group consisting of: a telephone number associated with the incoming call, a name associated with the telephone number, a picture associated with the telephone number, a length of the incoming call, a time that the incoming call was received by the base station, a cost of incoming call, and combinations thereof,
wherein the first communication port is configured to allow an exchange of data between the base station and the computer,
wherein the base station is configured to provide data communications between the first communication port and the second communication port for enabling communication of data from the mobile telephone network to the first communication port,
wherein the base station is configured to provide voice communications between the second communication port and the third communication port for enabling communication of voice from the mobile telephone network to the third communication port,
wherein the base station is configured to provide voice communications between the fifth communication port and the fourth communication port for enabling communication of voice from the second telephone network to the fourth communication port,
wherein base station is configured to receive a first incoming call via the second communication port, and send the first incoming call to the terrestrial telephone via the third communication port,
wherein the base station is configured to receive a second incoming call via the fifth communication port, and send the second incoming call to the terrestrial telephone via the third communication port and to the mobile telephone via the fourth communication port,
wherein the base station is configured to determine whether an outgoing telephone call to be placed is a long distance telephone call or a local telephone call,
wherein the base station is configured to place the outgoing telephone call originating at the terrestrial telephone via the second communication port in response to determining that the outgoing call to be placed is a long distance telephone call, and
wherein the base station is configured to place the outgoing telephone call originating at the terrestrial telephone via the fifth communication port in response to determining that the outgoing call is a local telephone call.

6. The system of claim 5, wherein the first communication port is configured to create the wireless connection to a computer via at least one of Bluetooth, IR, RF, Wi-Fi, WWAN, and WLAN.

7. The system of claim 5, wherein the base station is configured to enable a computer coupled to the first communication port to receive data from the Internet via a connection to a mobile network via the second communication port.

8. The system of claim 7, wherein the first communication port includes a WiFi circuit.

9. The system of claim 5, wherein the first communication port is also configured to create a wireless connection with a mobile telephone.

10. The system of claim 7, wherein the data includes at least one of a portion of a calendar file, a portion of a contact list, a music file, and a video file.

11. A method for placing and receiving telephone calls, the method comprising:
establishing a connection to a mobile telephone network using a second communication port of a base station;
establishing a connection to a terrestrial telephone using a third communication port of the base station; and
establishing a wireless connection to a computer using a first communication port of the base station;
establishing a connection to a mobile telephone network using a fourth communication port;
establishing a connection to a second telephone network using a fifth communication port;
receiving a first incoming call via the second communication port;
sending the first incoming call to the terrestrial telephone using the third communication port;
receiving a second incoming call via the fifth communication port;
sending the second incoming call to the terrestrial telephone using the third communication port and to a mobile telephone using the fourth communication port;
receiving data from the Internet via the second communication port; and sending the data to the computer via the first communication port;

determining whether an outgoing call to be placed is a local telephone call or a long distance telephone call;

placing the outgoing call originating at the terrestrial telephone via the second communication port in response to determining that the outgoing call is a long distance telephone call; and placing the outgoing call originating at the terrestrial telephone via the fifth communication port in response to determining that the outgoing call is a local telephone call.

12. The method of claim 11, further comprising outputting a signal strength of the mobile network on a display of the base station.

13. The method of claim 11, further comprising outputting an amount of battery life remaining for at least the mobile telephone on a display of the base station.

14. The method of claim 11, further comprising placing an outgoing call originating at the terrestrial telephone via the second communication port.

15. The method of claim 11, wherein the data includes at least one of a portion of a calendar file, a portion of a contact list, a music file, and a video file.

* * * * *